Oct. 20, 1970  F. J. FINK  3,534,421
POWER HEAD FOR CUTTING TOOLS
Filed Nov. 15, 1967  5 Sheets-Sheet 1

INVENTOR.
FRANK J. FINK
BY
McNENNY, FARRINGTON, PEARNE, & GORDON
ATTORNEYS

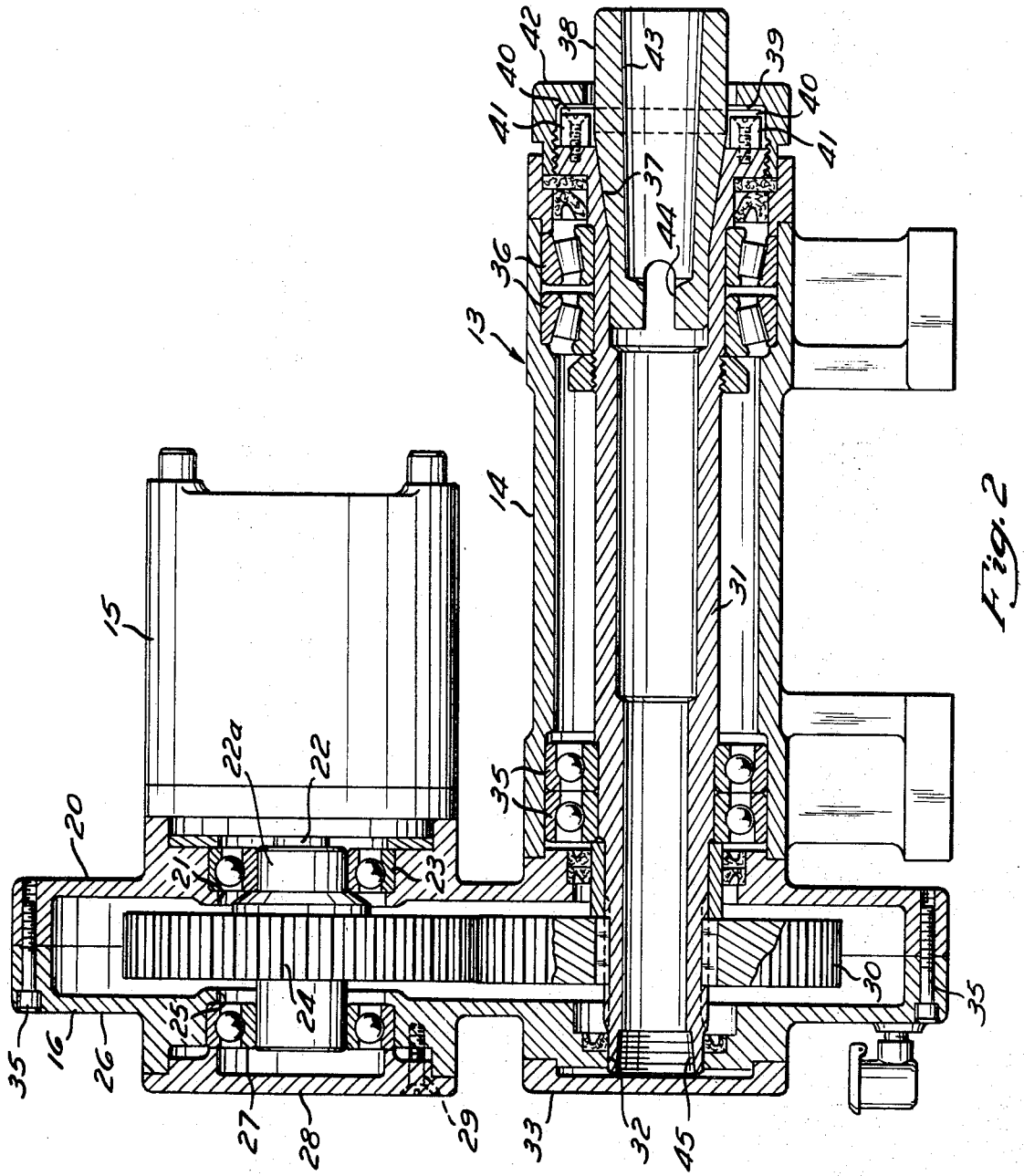

Oct. 20, 1970    F. J. FINK    3,534,421
POWER HEAD FOR CUTTING TOOLS
Filed Nov. 15, 1967    5 Sheets-Sheet 3
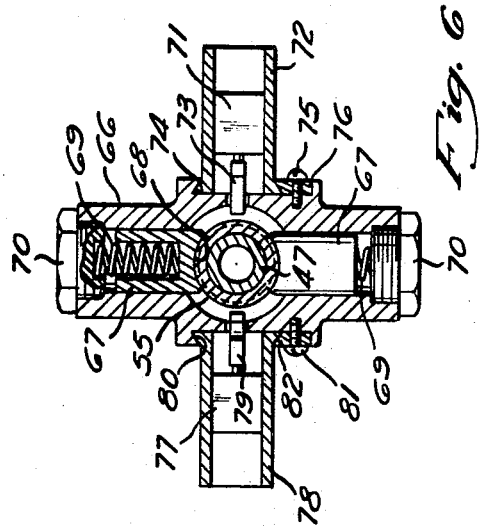
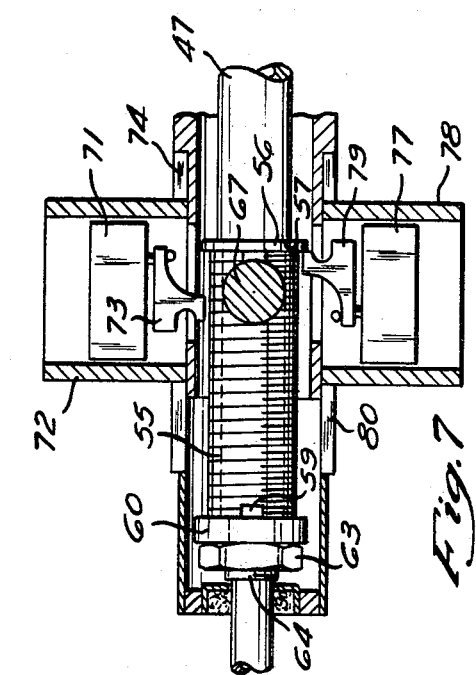
INVENTOR.
FRANK J. FINK
BY
McNENNY, FARRINGTON, PEARNE & GORDON
ATTORNEYS

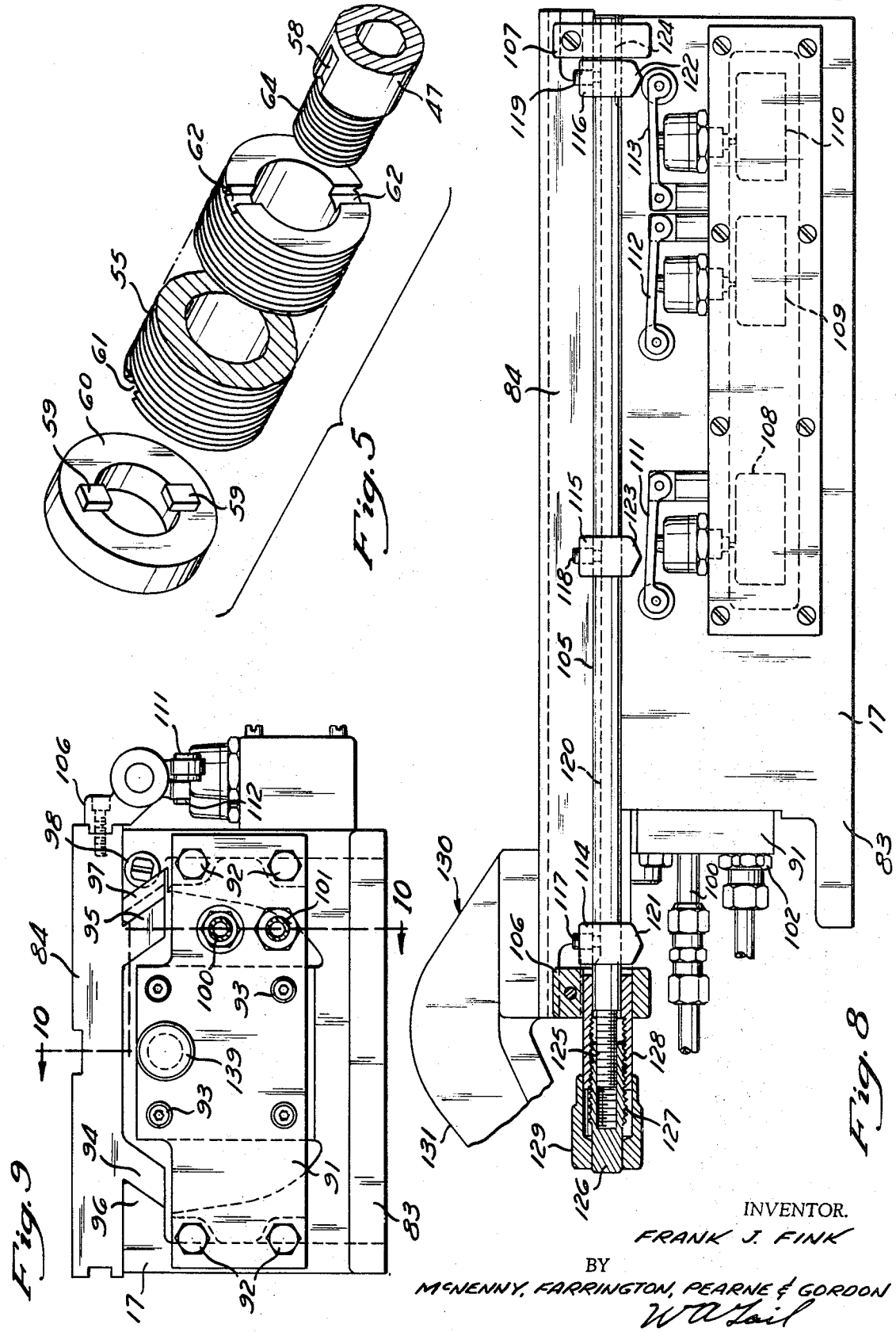

Oct. 20, 1970  F. J. FINK  3,534,421
POWER HEAD FOR CUTTING TOOLS
Filed Nov. 15, 1967  5 Sheets-Sheet 5
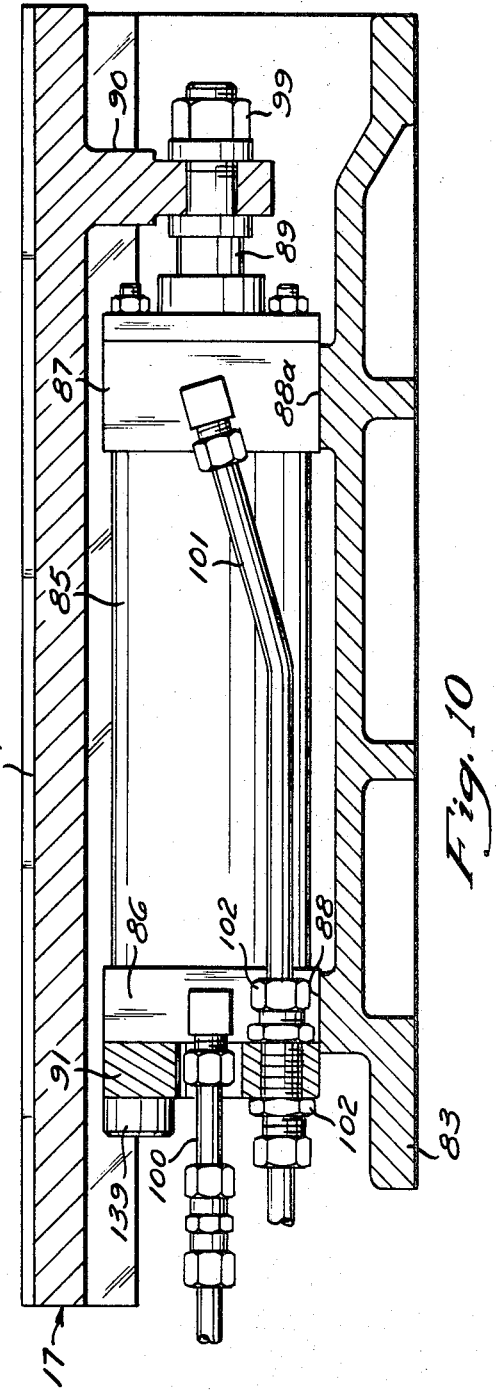
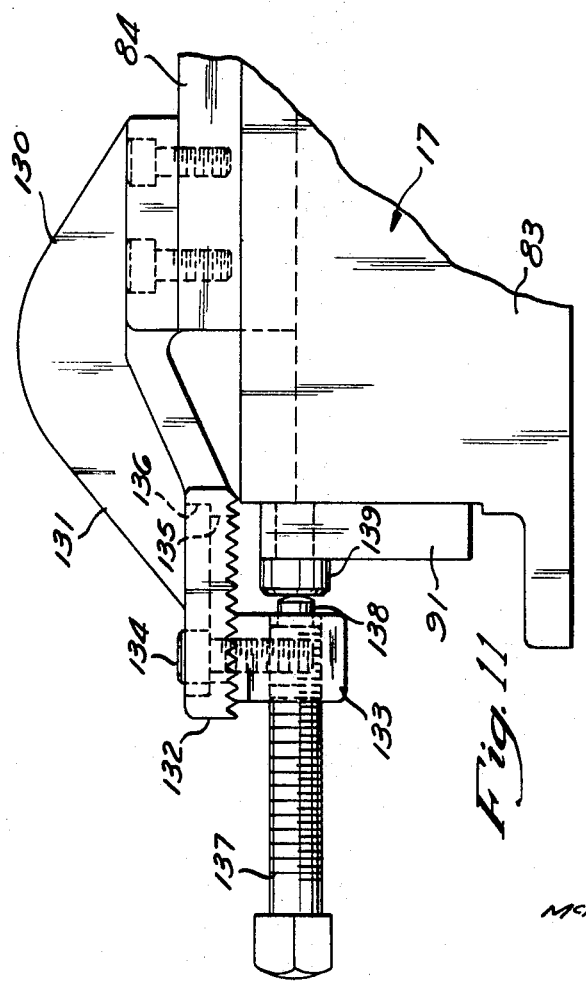
INVENTOR.
FRANK J. FINK
BY
McNENNY, FARRINGTON, PEARNE & GORDON
ATTORNEYS United States Patent Office 3,534,421
Patented Oct. 20, 1970

3,534,421
POWER HEAD FOR CUTTING TOOLS
Frank J. Fink, Chardon, Ohio, assignor to Imperial Manufacturing & Engineering Co., Middlefield, Ohio, a corporation of Michigan
Filed Nov. 15, 1967, Ser. No. 683,345
Int. Cl. B23g 1/00, 11/00
U.S. Cl. 10—105
11 Claims

ABSTRACT OF THE DISCLOSURE

A power head for driving demountable tools. The power head includes a rotatably driven arbor, a universally mountable power drive for imparting rotary motion to the arbor, and a fluid-driven platen which mounts and reciprocally drives the power head toward and away from a workpiece. The arbor may be adapted to receive a drill, or may be provided with a spindle for driving a cutting tool, such as a thread cutting head. If a cutting tool such as a thread cutting head is provided, the spindle mounting the thread cutting head is provided with a lead screw feed for axial movement of the spindle relative to its arbor.

BACKGROUND OF THE INVENTION

This invention relates to a power head for mounting and driving cutting or forming tools and, more particularly, relates to a versatile power unit which may be mounted in a plurality of positions and which may be easily adapted to accomplish a variety of cutting and turning operations without dismantling or replacing the entire unit. A power head according to the present invention may be employed as a power unit for performing cutting or turning operations on turret-mounted workpieces, or the power heads themselves may be turret-mounted for sequential operation on a workpiece.

Conventional power heads are designed to receive and drive single classes of tools. For example, a conventional power head is normally designed for a given class of tools, such as drills and related types of tools. In many such units, it is impossible to modify the power heads to perform other metal working operations, such as thread tapping operations. In other units, it is necessary to drastically modify the power head in order to accommodate and properly drive the thread tapping tool. Since such modifications are not normally justified by the time and expense involved therein, it is common practice to provide separate power heads which are specifically designed for a thread tapping operation.

SUMMARY OF INVENTION

The power unit according to this invention may be easily converted from a drilling or turning head to a threading head without basic modifications to the structure of the power head. Further, the power head includes a drive motor and gear box which may be mounted in a variety of positions dependent upon the required side or top clearance at the work site. According to further aspects of this invention, the power head is mounted on a fluid-driven platen which reciprocally drives the power head toward and away from a workpiece. A hydraulic drive cylinder is mounted within the platen and is easily removable therefrom for servicing or replacement. The platen is provided with rapid traverse and feed limit switches which may be adjusted according to the particular machining operation to be accomplished.

It is therefore a principal object of the present invention to provide a novel and improved power head for driving cutting or forming tools.

It is a more particular object of the present invention to provide a novel and improved fluid-operated power head having a drive unit connected therewith which may be mounted in a variety of positions to conform to clearance requirements during use of the power head and which includes an arbor within which different tool holders may be mounted.

It is a further object of the present invention to provide a novel and improved power head for driving demountable tools which is mounted on a fluid-driven platen which reciprocally drives the power head toward and away from the workpiece.

BRIEF DESCRIPTION OF THE DRAWINGS

FIG. 2 is a side elevation, partly in section, of a power head showing the power head employed as a drilling head in accordance with one aspect of the present invention;

FIG. 4 is a fragmentary side elevation, partly in section, of a power head according to this invention showing a tapping spindle mounted therein according to a further aspect of this invention;

FIG. 5 is an exploded, fragmentary, perspective view of the lead screw assembly employed in the tapping spindle unit;

FIG. 6 is a cross sectional view, the plane of the section being indicated by the line 6—6 in FIG. 4;

FIG. 7 is a fragmentary, cross sectional view, the plane of the section being indicated by the line 7—7 in FIG. 4;

FIG. 8 is a fragmentary side elevation, partly in section, illustrating the drive platen in accordance with this invention;

FIG. 9 is an end elevation of the platen;

FIG. 10 is a cross sectional view of the platen, the plane of the section being indicated by the line 10—10 in FIG. 9; and FIG. 11 is a fragmentary elevation of the platen illustrating the forward stroke-limiting device.

DESCRIPTION OF THE PREFERRED EMBODIMENT

General arrangement

Figure 1:
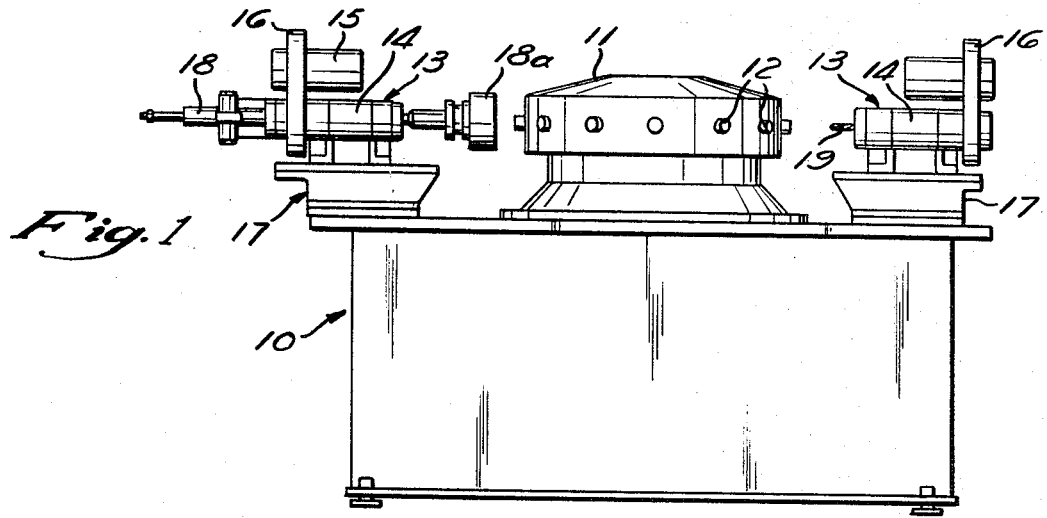
FIG. 1 is a side elevation of a multistation turret having a plurality of power heads according to this invention associated therewith.

FIG. 1 illustrates one type of machine system to which power heads in accordance with this invention are particularly well suited. In this machine system an indexing table 10 is provided with a multistation indexing turret 11 which receives and conveys a plurality of workpieces 12. Each workpiece 12 is successively conveyed to work stations which are situated around the table 10. Power heads 13 according to this invention are located at the work stations to progressively work the workpieces 13. Each power head 13 includes an arbor housing 14, a drive motor 15, and a gear box 16. Each power head 13 is mounted on a drive platen 17 which reciprocates its power head radially toward and away from a workpiece 12 which is dwelling at its work station. The power head 13 mounted at the left side of the table 10 in FIG. 1 is illustrated with a thread cutting attachment 18 and the other power head 13 drives a drill 19.

Power head drill unit

Referring now to FIG. 2, the power head 13 shown in that figure is adapted to receive and drive a drill 19 (not shown in FIG. 2). The power head 13 includes the drive motor 15 which, in the illustrated embodiment, is a reversible fluid motor but which may be an electric motor. The motor 15 is removably fixed to a gear housing plate 20 by bolts (not shown). The plate 20 is provided with an aperture 21 through which a drive shaft 22 extends. The drive shaft 22 is connected to drive an input shaft journalled on bearings 23 and 27 in the housing plates 20 and 26 respectively. A spur gear 24 is mounted on the shaft 22a. An opening 25 in a gear housing plate 26 is closed by a cover plate 28 which is removably mounted over the opening 25 by screws 29. The spur gear 24 meshes with and drives a spur gear 30 which is keyed to an arbor 31. The arbor 31 extends into an opening 32 in the plate 26, and the opening 32 is closed by a cap 33. As may be seen in FIG. 3, the cap 33 is retained in position by a plurality of bolts 34. The plates 20 and 26 are held together by a multiplicity of machine screws 35 to form the housing for the gears 24 and 30. The gear housing 16 is removably fixed to the spindle housing 14 by machine screws (not shown) which extend from the spindle housing 14 into the plate 20 in axial alignment with the machine screws 34.

In the illustrated embodiment, the gears 24 and 30 provide a 1:1 gear ratio between the motor 15 and the arbor 31. However, sufficient clearance is provided by the housing 16 for various gear ratios. The illustrated gear housing is sized to accommodate gear ratios from 2:1 to 1:2.

The various subassemblies are arranged so that they may be mounted in several positions so that the shape of the unit can be easily modified to conform to and fit into the space available in a particular machine system.

Figure 3:
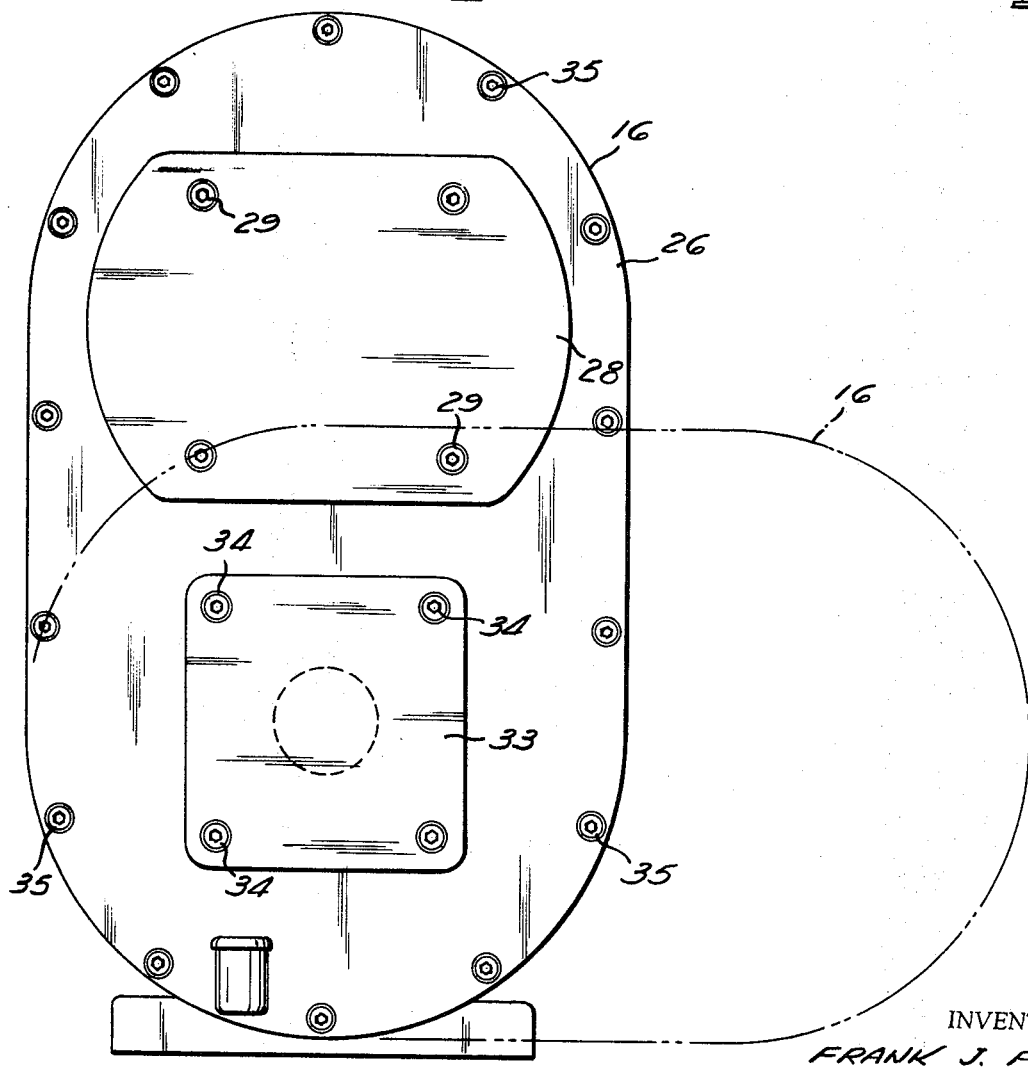
FIG. 3 is a rear elevation of the power head illustrated in FIG. 2 showing, in phantom outline, one alternate orientation of the gear box and drive motor.

In the position illustrated in FIG. 2 and in solid outline in FIG. 3, the motor and gear housing 16 provides maximum side and end clearance. In order to provide maximum top clearance, the gear housing 16 and the motor 15 may be removed from the spindle housing 14 and bolted in the position illustrated in phantom outline in FIG. 3. If clearance is required on the top and right hand side of the power head as viewed in FIG. 3, the gear housing 16 and the motor 15 may be oriented 180° from the phantom position therein illustrated. In order to maximize forward stroke clearance, the motor 15 may be removed from its illustrated position and mounted on the plate 26 in place of the cover 28. The cover 28 would then be employed to cover the opening 21. Of course, it should be appreciated that the motor 15 may be mounted in this manner if the gear box 16 is oriented in any of the other positions described above.

The arbor 31 is mounted for axial rotation within the arbor housing 14 by bearings 35 and 36, and has a conically flared end portion 37 within which a drill shank receiving chuck 38 is mounted. The chuck 38 is provided with an annular flange having slots 40 therein. A plurality of keys 41 are fixed to the end of the arbor 31 and are received in the slots 40 so that the chuck 38 and the arbor 31 rotate as a unit. In order to prevent axial displacement of the chuck 38 relative to the arbor 31, a cap 42 is threadedly secured to the end of the arbor 31 and covers the flange 39. The chuck 38 is provided with a tapered bore 43 to receive a standard drill shank. The arbor 31 is hollow so that, with the cap 33 removed, a pin may be inserted through the arbor 31 and through an opening 44 in the chuck 38 to remove the drill from the bore 43. The open end of the arbor 31 is provided with threads 45 so that a swivel coupling may be connected thereto to supply cutting fluid through the arbor 31. When cutting fluid is supplied, appropriate passages must be provided in the tool mounted on the unit.

The power head employed with a threading tool

FIGS. 4 through 7 illustrate a power head 13 equipped with a threading attachment. As is shown in FIG. 4, a hollow spindle 47 is mounted within the arbor 31 by a threading adapter 48. The threading adapter 48 is provided with an annular flange 49 having recesses 50 therein to receive the keys 41 so that the adapter 48 rotates with the arbor 31. The adapter 48 is clamped against the conical surface 37 by a cap 51 which engages the flange 49 and is threadedly attached to the arbor 31. One end of the adapter 48 is received within a counterbore 52 in the arbor 31. That end of the adapter 48 is provided with internal splines 53 which cooperate with external splines 54 on the spindle 47 so that it rotates with the arbor 31 but is axially movable relative thereto.

The rearward end of the spindle 47 projects through the open end of the arbor and through an externally threaded lead screw 55. One end of the lead screw 55 butts against a washer 56 which in turn butts against a shoulder 57 on the spindle 47. The rearward end of the spindle 47 extends beyond the lead screw 55 and, as may be seen most clearly in FIG. 5, has keyways 58 cut therein which cooperate with keys 59 provided on a washer 60. The keys 59 are also received by slots 61 at one end of the lead screw 55. The other end of the lead screw 55 is also provided with slots 62 so that the position of the lead screw may be reversed if the threads at one end of the lead screw become worn. The washer 60 is held against the lead screw and is retained in its keyed relationship with the spindle 47 by a nut 63 which is threaded onto an end 64 of the spindle 47.

The projecting end of the spindle 47 and the lead screw 55 are covered by a housing 65 which is mounted over the opening 32 in place of the cap 33. The housing 65 includes a nut casing 66 within which a pair of opposed lead screw nuts 67 are slidably mounted. The nuts 67 have threaded ends 68 which cooperate with the external threads on the lead screw 55 and are biased into engagement with those threads by springs 69. The springs 69 and the nuts 67 may be removed from the casing 66 for replacement by removing cover screws 70. The spring 69 serves to protect the tools, since excessive end loads cause the nuts 67 to be cammed back against the springs to terminate feeding when overloads occur.

As the arbor 31 is rotated by the motor 15 through the gears 24 and 30, the spindle 47 is likewise rotated through the splines 53 and 54. The threaded connection between the lead screw 55 and the nuts 67 drives the spindle 47 forwardly or rearwardly, depending upon the direction of rotation of the motor 15.

A thread cutting tool, such as the external thread cutting tool 18a, is mounted at the end of the spindle 47. The lead of the lead screw 55 is the same as the lead of the threads being cut so proper starting is achieved and the tool is moved forward or rearward at the proper rate of feed. If different threads with different leads are to be cut, the lead screw 55 is replaced with a different lead screw having the proper lead.

The extent of the axial movement of the spindle 47 is controlled by a mechanism best illustrated in FIGS. 6 and 7, which includes two limit switches 71 and 77. The limit switch 71 is mounted within an axially adjustable housing 72 and has an arm 73 which is engaged by the washer 60 when the spindle 47 reaches its predetermined axially extended position. To establish this predetermined axially extended position, the housing 72, and therefore the arm 73, may be axially adjusted along a track 74 by loosening a clamping screw 75 and a cooperating washer 76.

The axially retracted position of the spindle 47 is governed by a limit switch 77 which is mounted within a housing 78 and which has an arm 79 associated therewith. The predetermined axially retracted position of the spindle 47 is established when the washer 56 butts against the arm 79.

When the washer 60 butts against the arm 73, the motor 15 is reversed so that the forward stroke of the spindle 47 is stopped and reversed. When the arm 79 is contacted by the washer 56, the motor 15 is stopped. The predetermined axially retracted position of the spindle 47 may be adjusted by adjusting the position of the switch 77, and therefore its arm 79. To effect this adjustment, the housing 78 is moved axially along a track 80 by loosening a screw 81 and an associated washer 82.

The platen for the power head

Referring now to FIGS. 8 through 11, the platen 17 for mounting the power head 13 is illustrated. The platen 17 includes a fixed base frame 83 and a movable slide 84. The base frame 83 forms a cradle which receives a double-acting fluid power cylinder 85. The cylinder 85 is provided with rectangular heads 86 and 87 which respectively rest on supports 88 and 88a formed in the frame 83. The cylinder 85 has a ram 89 which is connected to and drives a depending portion 90 of the slide 84. The rear of the frame 83 is closed by a plate 91 which is removably fixed to the frame 83 by bolts 92. The rear head plate 86 of the cylinder 85 is fixed to the plate 91 by bolts 93.

The slide 84 has a pair of dovetail legs 94 and 95 which respectively cooperate with a mortised portion 96 of the frame 83 and a gib 97. The gib 97 is tapered from the rear of the platen 17 toward the front of the platen and is axially adjustable by an adjusting screw 98. Any wear between the slide 84 and the frame 83 may be taken up by adjusting the gib 97 forwardly with respect to the platen.

The cylinder 85 may be removed from its illustrated position and replaced by removing a nut 99 from the end of the ram 89 and removing the bolts 92. The ram 89 may then be removed from the strap 90 and the cylinder 85 may be removed from the base 83 together with the plate 91.

Fluid is admitted to the cylinder 85 to drive the ram 89 forwardly through a line 100. As the ram 89 is driven forwardly, fluid is exhausted ahead of the piston through a line 101. The ram 89 is driven rearwardly by admitting fluid through the line 101 and exhausting fluid through the line 100. In the illustrated embodiment, the line 100 extends through an aperture in the plate 91. The line 101 extends through but is fixed to the plate 91 by nuts 102 to add rigidity to the line 101. Therefore, the lines may be removed with the cylinder.

The power head 13 is fixed to the upper surface of the slide 84 so that the power head is advanced toward and retracted from a workpiece 12 during each cycle of the cylinder 85.

As may be seen in FIGS. 8 and 9, a limit switch control is provided to govern the extent and rate of the stroke of the ram 89. There is provided a cam mounting bar 105 which extends along the length of the slide 84 and which is mounted thereon by mounting brackets 106 and 107. A plurality of switches 108, 109, and 110 are fixed to the base frame 83 and are respectively provided with actuating levers 111, 112, and 113. For reasons which will become apparent, the levers 111 and 113 are in alignment and the lever 112 is displaced from such alignment (see FIG. 9).

The cam bar 105 carries a plurality of cams 114, 115, and 116 which are respectively fixed to the cam bar 105 by setscrews 117, 118, and 119. The setscrews 117–119 project through each cam 114–116 and enter into a slot 120 on the cam bar 105. The cams 114–116, therefore, may be adjusted along the axial extent of the cam bar 105 by loosening the setscrews 117–119 and sliding each cam 114–116 to a desired position. The cams 114 and 116 have downwardly extending legs 121 and 122, respectively, which are in alignment and which respectively engage the arms 111 and 113. The cam 115 has a leg 123 which is offset with respect to the legs 121 and 122, and which engages the lever 112.

One end of the cam bar 105 is provided with a slot 124 and is keyed against axial rotation to the bracket 107. The other end of the cam bar 105 is provided with a threaded extension 125 and the extension 125 is threadedly received by a sleeve 126. The sleeve 126 is provided with external threads 127, which have a greater pitch than the threads on the cushion 125. The sleeve 126 is threadedly received by an internally threaded sleeve 128 which, in turn, is fixed to the bracket 106. The sleeve 126 may be turned by an adjusting screw 129 which is fixed thereto. Clockwise rotation of the adjusting screw 129 threads the sleeve 126 into the sleeve 128 to move the cam bar 105 to the right as viewed in FIG. 8. As the adjusting screw is rotated in this manner, the threaded end portion 125 of the cam bar 105 is moved to the left with respect to the sleeve 126. However, since the pitch of the threads on portion 125 is less than the pitch of the threads 127, the cam bar 105 is moved to the right as viewed in FIG. 8. By clockwise or counterclockwise rotation of the adjusting screw 129, the bar 105, and therefore the cams 114–116, may be adjusted relative to the arms 111–113. This structure provides fine veneer adjustment of the cams and is normally used to precisely determine the maximum forward position of the slide 84. Normally the other slide positions are not critical so rough positioning of the cams controlling these positions is sufficient.

A forward stroke of the ram 89, and therefore forward movement of the power head 13, is initiated by the admission of fluid to the line 100 and the simultaneous withdrawal of fluid from the line 101. Such admission and withdrawal of fluid is governed by a control valve (not shown) which valve, in turn, is responsive to a manual switch or may be responsive to the position of the indexing turret 11. Initial movement of the ram 89 and its power head 13 is at a rapid transverse rate which continues until the cam 115 strikes the arm 112. When the arm 112 is depressed by the cam 115, the limit switch 109 is actuated to operate a valve (not shown) to throttle the admission of fluid through the line 100 so that further movement of the ram 89 is at a slower rate. The extent of the slow feed rate of the ram 89 and the power head 13 may be varied by moving the cam 115 to a predetermined position on the cam bar 105. The extent of the slow feed of the ram 89 may correspond to the depth of a drill cut or the extent of a turning or other cutting operation on a workpiece.

After the cam 115 has actuated the arm 112, the slow feed rate of the ram 89 continues until the leg 121 of the cam 114 engages the arm 111. When the arm 111 is depressed by the leg 121, the limit switch 108 is actuated. Actuation of the limit switch 108 stops the forward travel of the ram 89 by closing the valve which supplies fluid pressure through the line 100. Actuation of the limit switch 108 operates a valve (not shown) to admit fluid pressure through the line 101 and exhaust fluid through the line 100. The valves which are responsive to the actuation of the limit switch 108 to reverse the flow of fluid in the lines 100 and 101 may have a time delay mechanism associated therewith to delay the reversal of the ram 89 after it has reached the limit of its stroke so that the power head may dwell for a facing operation. After any time delay mechanism performs its function, the ram 89, and therefore the power head 13, are driven rearwardly until the leg 122 of the cam 116 engages the arm 113. Actuation of the arm 113 operates the limit switch 110 to stop flow through the lines 100 and 101.

In order to prevent any damage to a power head 13 or to the turret 11, a positive stop 130 is provided on the slide 84. The stop 130 comprises an arm 131 which extends downwardly over the rear of the slide 84 and has a toothed end portion 132 which holds a block 133. The block 133 is adjustably fastened to the portion 132 by a machine screw 134 which extends through a slot 135 in the portion 132 and has its head received by an enlarged counter slot 136. An adjusting screw 137 extends through the block 133 and has an end 138 which butts against a stop button 139 when the slide 84 has reached the extent of its stroke. Coarse stop adjustments may be effected by loosening the screw 134 and moving the block 133 to another position on the portion 132. Fine adjustments may be effected by adjusting the screw 137.

Operation

The work table illustrated in FIG. 1 is arranged to perform sequential drilling and thread cutting operations. Workpieces 12 are mounted on the indexing table 11 so that they are first indexed to the power head 13 which drives the drill 19 and are subsequently indexed to the power head 13 which is provided with the external thread-cutting device 18. It should be appreciated that other operations may be performed by other power heads 13 or by other metal working devices mounted on the table. When a workpiece is indexed to the power head which carries the drill 19, valves (not shown) are opened to drive the motor 15, and therefore the drill 19. At the same time, a valve (not shown) is operated to admit fluid pressure through the line 100 to the cylinder 85 and to exhaust fluid through the line 101 so that the ram 89 drives the power head at a rapid traverse rate toward the workpiece 12. Just prior to metal working contact of the drill 19 with the workpiece 12, the limit switch 109 is actuated by the cam arm 123. Actuation of the limit switch 109 causes the power head 13 to advance at slower rate which corresponds to a desired feed rate for the drill 19. When the cam leg 121 depresses the arm 113, the limit switch 110 is actuated to stop the forward feed of the power head and, after a suitable dwell period, reverse the power head 13 to retract the drill 19 from the workpiece. Retraction of the drill 19 continues until the retraction is stopped by actuation of the limit switch 110. Actuation of the limit switch 110 may also stop the motor 15 and cause the indexing head 11 to index.

When the workpiece 12 reaches a position in line with the thread-cutting tool 18a on the power head 13, fluid is admitted to the cylinder 85 through the line 100 to drive the ram 89, and therefore the power head, toward the workpiece at a rapid traverse rate. Normally slow rates of advance are not used for tapping, since the feed for actual tapping is provided by the lead screw. The cutting head 18 is stopped when the arm 111 is depressed and the slide 84 dwells in this position during the following cutting stroke. Acutuation of the limit switch 108 starts the motor 15 to drive the spindle 47 outwardly relative to the arbor housing 14. The motor 15 is reversed when the switch arm 73 is struck by the washer 16 to retract the cutting head from the work. When the switch arm 79 is struck by the washer 57, the motor is stopped and the slide 84 is retracted until the cam leg 112 strikes the arm 13.

Although preferred embodiments of this invention are illustrated, it is to be understood that various modifications and rearrangements of parts may be resorted to without departing from the scope of the invention as defined in the following claims.

What is claimed is:

1. A power head for driving demountable tools comprising an arbor frame provided with mounting means for securing said arbor frame to a support, a tubular arbor journaled in said arbor frame for rotation about its axis and fixed against axial movement, means for attaching a tool to said arbor at one end thereof, a gear casing removably secured to said arbor frame at the other end thereof, at least two gears in said gear casing, one of said gears being connected to said arbor, the other of said gears being journaled in said gear casing for rotation about a second axis laterally spaced from and substantially parallel to said arbor axis, a motor having an output shaft connected to said other gear, said casing and motor providing connecting means permitting said motor to be selectively mounted on said casing along said second axis in either of two positions on opposite sides of said other gear, said casing having lateral dimensions in at least three directions from said arbor axis which are less than the spacing between said mounting means of said arbor frame and said arbor axis, said gear casing and arbor frame providing connecting means for securing said gear casing to said arbor frame in any one of at least three selected positions with respect to said arbor axis.

2. A power head as set forth in claim 1 wherein said means for attaching a tool to said arbor includes a removable chuck provided with a taper mating with a taper formed in one end of said arbor, and keys preventing relative rotation between said arbor and chuck.

3. A power head as set forth in claim 1 wherein said means for attaching a tool includes a tool spindle extending through said arbor, means preventing relative rotation between said spindle and arbor while permitting relative axial motion therebetween, and lead screw means connected between said spindle and gear casing operable to axially move said spindle relative to said frame and arbor in response to rotation of said spindle.

4. A power head as set forth in claim 3 wherein said lead screw means includes a tubular lead screw mounted on said spindle so that it can be turned end for end, and said means preventing relative rotation between said spindle and arbor includes an adapter member removably mounted on said arbor formed with a spline interengaging a spline formed on said tool spindle.

5. A power head as set forth in claim 3 wherein said lead screw is tubular and is mounted on said spindle rearwardly of said gear casing, and adjustable limit means are provided to limit the travel of said spindle produced by said lead screw means.

6. A power head set forth in claim 5 wherein said limit means are mounted on a lead screw housing which is removably mounted on said gear casing on the side thereof remote from said arbor frame.

7. A power head as set forth in claim 6 wherein said spindle, lead screw, and said lead screw housing are all removable from said power head without removing said arbor or gear means from said arbor frame.

8. A power head according to claim 1 wherein said mounting means are mounted on a movable platen which is adapted to advance the arbor frame and its arbor axially toward a workpiece.

9. A power head according to claim 1 wherein a spindle is mounted within said arbor and is splined to said arbor for axial rotation therewith but is axially movable relative to said arbor, a lead screw fixed to said spindle, cooperating feed nut means fixed to said arbor frame, and a thread-cutting tool is adapted to be fixed to said spindle, whereby rotation of said arbor causes axial rotation of said spindle and said feed nut means and said lead screw cause axial movement of said spindle relative to said arbor.

10. A power head as set forth in claim 1 wherein said motor is located on the side of said gear casing toward said one end of said arbor when mounted in one of said two positions and is on the side of said gear casing opposite said one end of said arbor when mounted in the other of said two positions.

11. A power head as set forth in claim 10 wherein said second axis is located horizontally to one side of said arbor axis when said casing is mounted in one of said selected positions, is located above said arbor axis when said casing is mounted in another of said selected positions and is horizontally located on the opposite side of said arbor axis when located in still another of said selected positions.

References Cited

UNITED STATES PATENTS

| | | | |
|---|---|---|---|
| 2,051,052 | 8/1936 | Morgan | 10—139 |
| 2,587,352 | 2/1952 | Manning | 10—139 |
| 2,751,614 | 6/1956 | Bourguignon | 10—129 |
| 2,796,767 | 6/1957 | Carpenter | 10—139 |
| 2,875,650 | 3/1959 | Hazlinger | 10—139 |
| 2,930,261 | 3/1960 | Emrick | 10—139 |
| 3,191,205 | 6/1965 | Gilbert | 10—139 |
| 3,283,664 | 11/1966 | Cross et al. | 77—32.8 |
| 3,389,413 | 6/1968 | Van Den Kieboom | 77—32.8 |
| 3,224,301 | 12/1965 | Vickers | 77—33 |
| 3,439,581 | 4/1969 | Wilkens | 77—33 |

CHARLES W. LANHAM, Primary Examiner

E. M. COMBS, Assistant Examiner

U.S. Cl. X.R.

10—129, 139